US012596291B2

(12) United States Patent
Seo et al.

(10) Patent No.: US 12,596,291 B2
(45) Date of Patent: Apr. 7, 2026

(54) LENS ASSEMBLY AND A CAMERA MODULE INCLUDING THE SAME

(71) Applicant: LG INNOTEK CO., LTD., Seoul (KR)

(72) Inventors: Eun Sung Seo, Seoul (KR); Dae Sik Jang, Seoul (KR); Ji Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 757 days.

(21) Appl. No.: 17/413,258

(22) PCT Filed: Dec. 11, 2019

(86) PCT No.: PCT/KR2019/017485
§ 371 (c)(1),
(2) Date: Jun. 11, 2021

(87) PCT Pub. No.: WO2020/122594
PCT Pub. Date: Jun. 18, 2020

(65) Prior Publication Data
US 2022/0128885 A1      Apr. 28, 2022

(30) Foreign Application Priority Data

Dec. 12, 2018      (KR) ........................ 10-2018-0160235

(51) Int. Cl.
*G03B 13/36*      (2021.01)
*G02B 3/12*      (2006.01)
(Continued)

(52) U.S. Cl.
CPC .............. *G03B 13/36* (2013.01); *G02B 3/12* (2013.01); *G02B 3/14* (2013.01); *G02B 7/021* (2013.01);
(Continued)

(58) Field of Classification Search
CPC .......... G03B 13/36; G03B 7/021; G03B 5/00; G03B 2205/0046; G03B 30/00;
(Continued)

(56) References Cited

U.S. PATENT DOCUMENTS 7,230,771 B2      6/2007  Kuiper et al.
7,265,911 B2 *    9/2007  Goosey, Jr. ........ G02B 15/1425
                                                  359/666

(Continued)

FOREIGN PATENT DOCUMENTS

JP      2009-505166 A      2/2009
JP      2011-13578 A      1/2011
(Continued)

OTHER PUBLICATIONS

Gross et al. âHandbook of Optical Systems vol. 3: Aberration Theory and Correction of Optical Systemsâ Weinheim Germany, WILEY-VCH Verlag Gmbh & Co. KGaA, pp. 377-379 (Year: 2007) (Year: 2007).*

(Continued)

*Primary Examiner* — Thomas K Pham
*Assistant Examiner* — Jennifer A Jones
(74) *Attorney, Agent, or Firm* — Birch, Stewart, Kolasch & Birch, LLP

(57)      ABSTRACT
The lens assembly may include a housing, a first group lens assembly disposed in the housing, and a second group lens assembly disposed at one side of the first group lens assembly. The first group lens assembly may be a fixed lens assembly, and may include a first lens and a liquid lens. The second group lens assembly may be a movable lens assembly and may include a second lens group. The first group lens assembly may have a negative (−) refractive power as a whole, and the second group lens assembly may have a positive (+) refractive power as a whole.

16 Claims, 9 Drawing Sheets

(51) Int. Cl.

| | | |
|---|---|---|
| *G02B 3/14* | (2006.01) |
| *G02B 7/02* | (2021.01) |
| *G02B 15/14* | (2006.01) |
| *G02B 26/00* | (2006.01) |
| *G03B 5/00* | (2021.01) |
| *H04N 23/51* | (2023.01) |
| *H04N 23/55* | (2023.01) |

(52) U.S. Cl.
CPC ....... *G02B 15/1425* (2019.08); *G02B 26/005* (2013.01); *G03B 5/00* (2013.01); *G03B 2205/0046* (2013.01); *H04N 23/51* (2023.01); *H04N 23/55* (2023.01)

(58) Field of Classification Search
CPC .... G03B 2205/0069; G03B 2205/0084; G03B 17/12; G02B 3/12; G02B 3/14; G02B 15/1425; G02B 26/005; G02B 15/04; G02B 9/10; G02B 13/02; G02B 15/143507; H04N 23/51; H04N 23/55
See application file for complete search history.

(56) References Cited

U.S. PATENT DOCUMENTS

| | | | | |
|---|---|---|---|---|
| 7,317,580 | B2 * | 1/2008 | Kogo | ....................... G02B 3/14 |
| | | | | 359/716 |
| 7,855,838 | B2 * | 12/2010 | Jannard | ......... G02B 15/143105 |
| | | | | 359/689 |

| | | | | |
|---|---|---|---|---|
| 2007/0247727 | A1 | 10/2007 | Kim | |
| 2009/0185281 | A1 * | 7/2009 | Hendriks | ............. G02B 26/005 |
| | | | | 359/666 |
| 2011/0090571 | A1 * | 4/2011 | Wada | ..................... G02B 13/18 |
| | | | | 359/682 |
| 2018/0084199 | A1 * | 3/2018 | Duckett, III | ... G02B 15/143507 |
| 2022/0163706 | A1 * | 5/2022 | Feldman | ............ G02B 13/0065 |

FOREIGN PATENT DOCUMENTS

| | | | | |
|---|---|---|---|---|
| KR | 10-2005-0033308 | A | 4/2005 | |
| KR | 10-2007-0012588 | A | 1/2007 | |
| KR | 10-2007-0103812 | A | 10/2007 | |
| KR | 10-1034521 | B1 | 5/2011 | |
| KR | 10-1505699 | B1 | 3/2015 | |
| KR | 10-2016-0054495 | A | 5/2016 | |
| KR | 10-2018-0012150 | A | 2/2018 | |
| KR | 20180012150 | A * | 2/2018 | ............... G03B 3/12 |

OTHER PUBLICATIONS

International Search Report (PCT/ISA/210) issued in PCT/KR2019/017485, dated Apr. 6, 2020.

* cited by examiner

【FIG. 1】
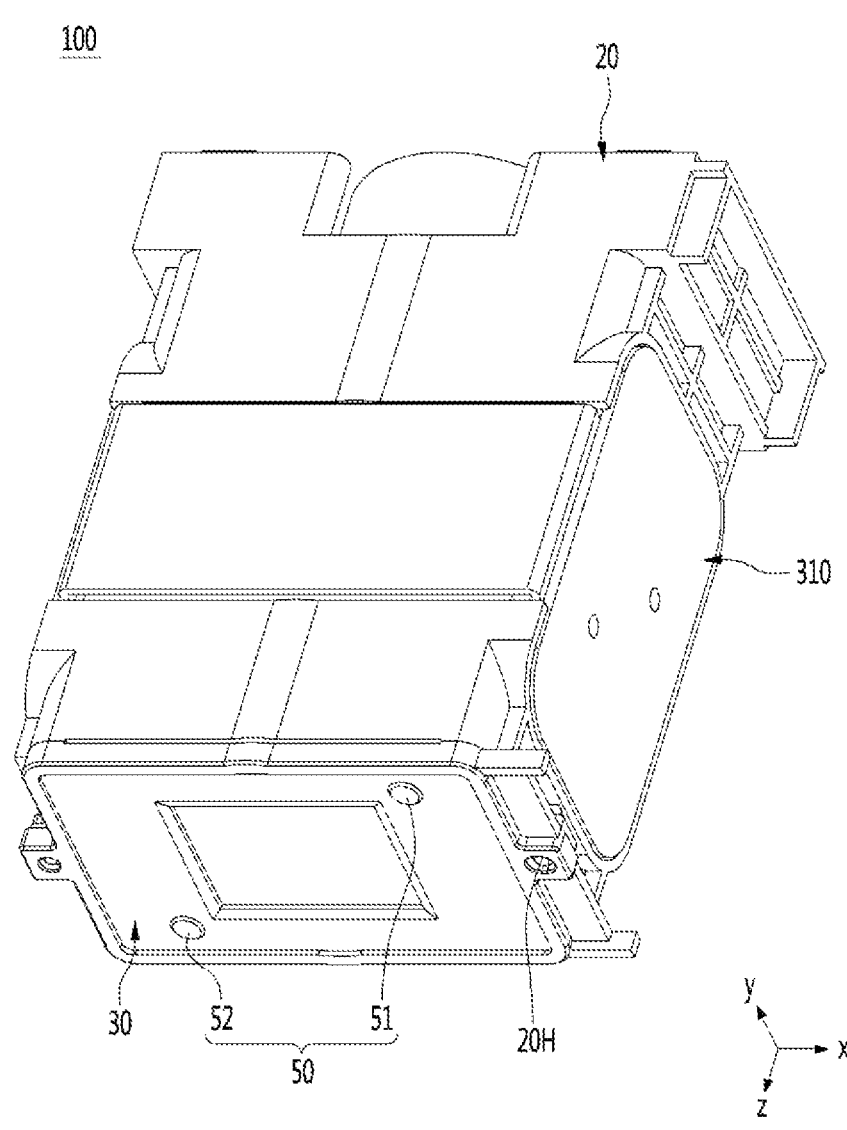

[FIG. 2]

【FIG. 3】
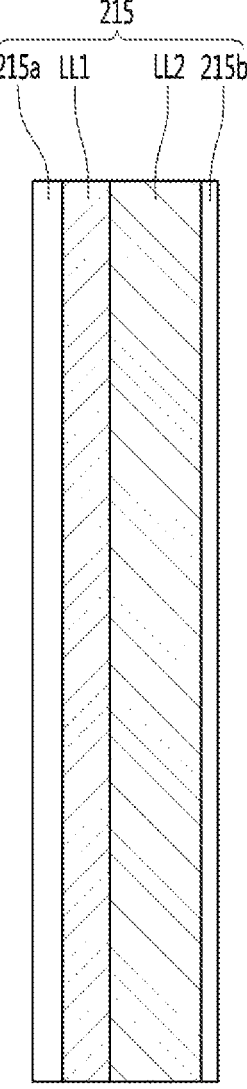

[FIG. 4]
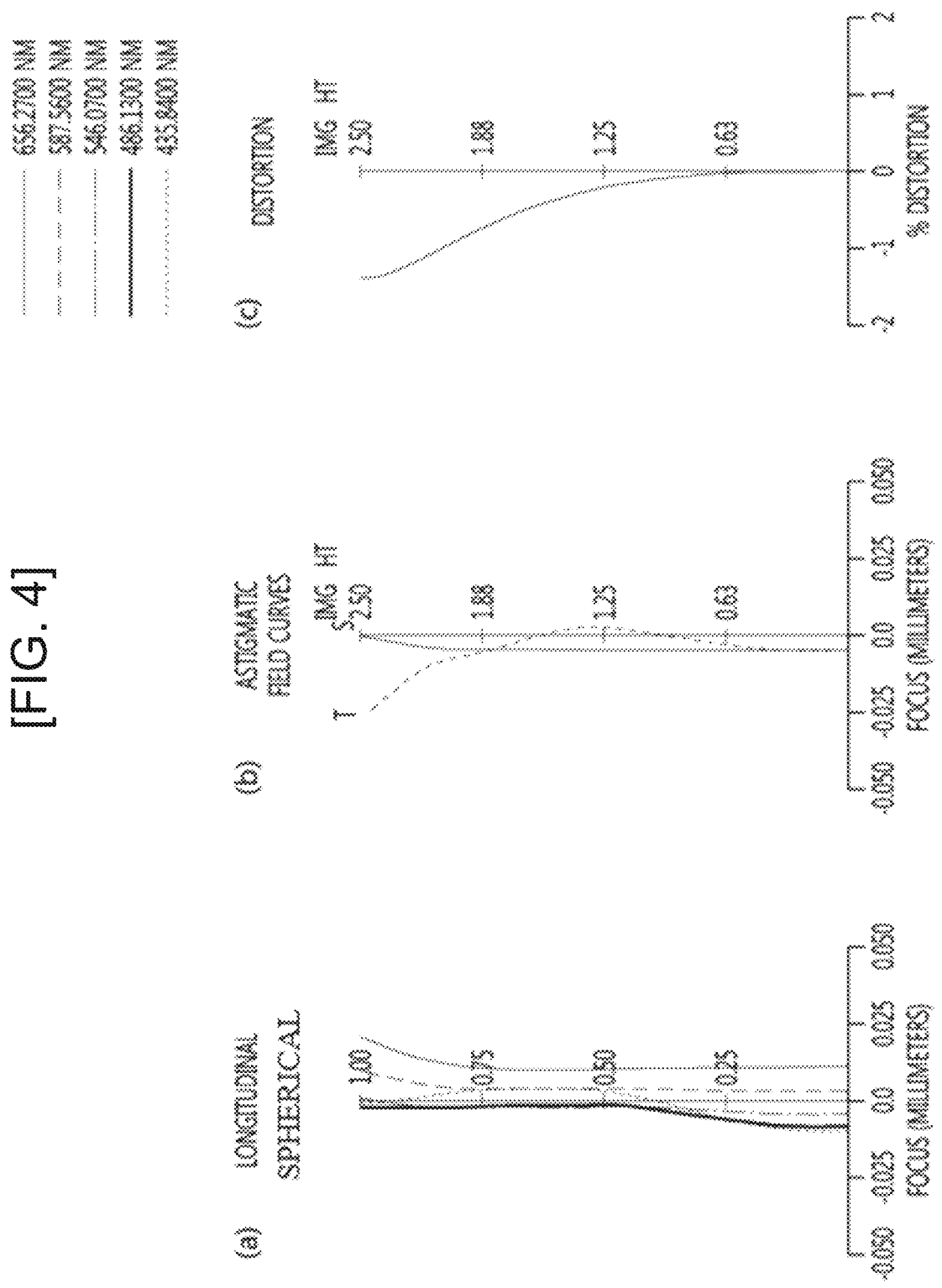

[FIG. 5]
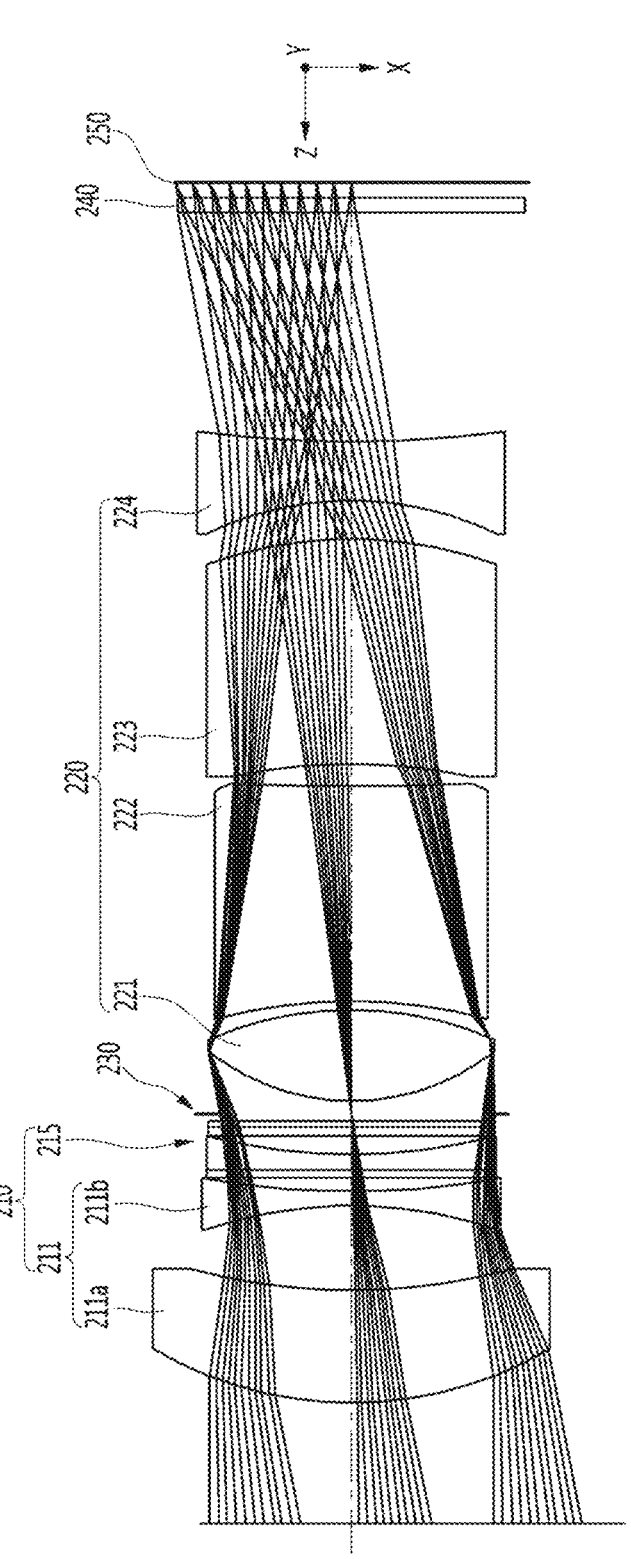

【FIG. 6】
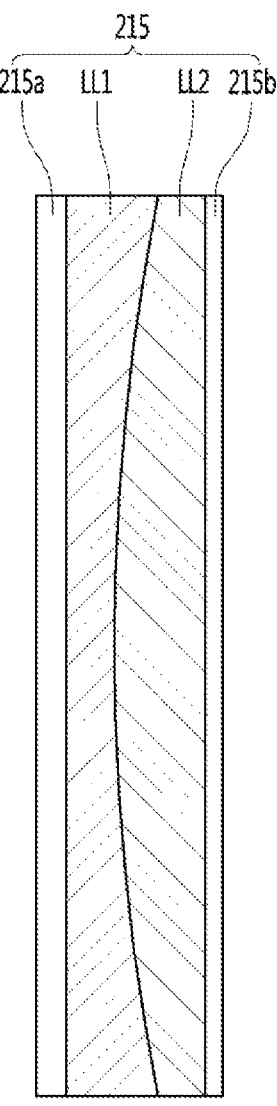

[FIG. 7]
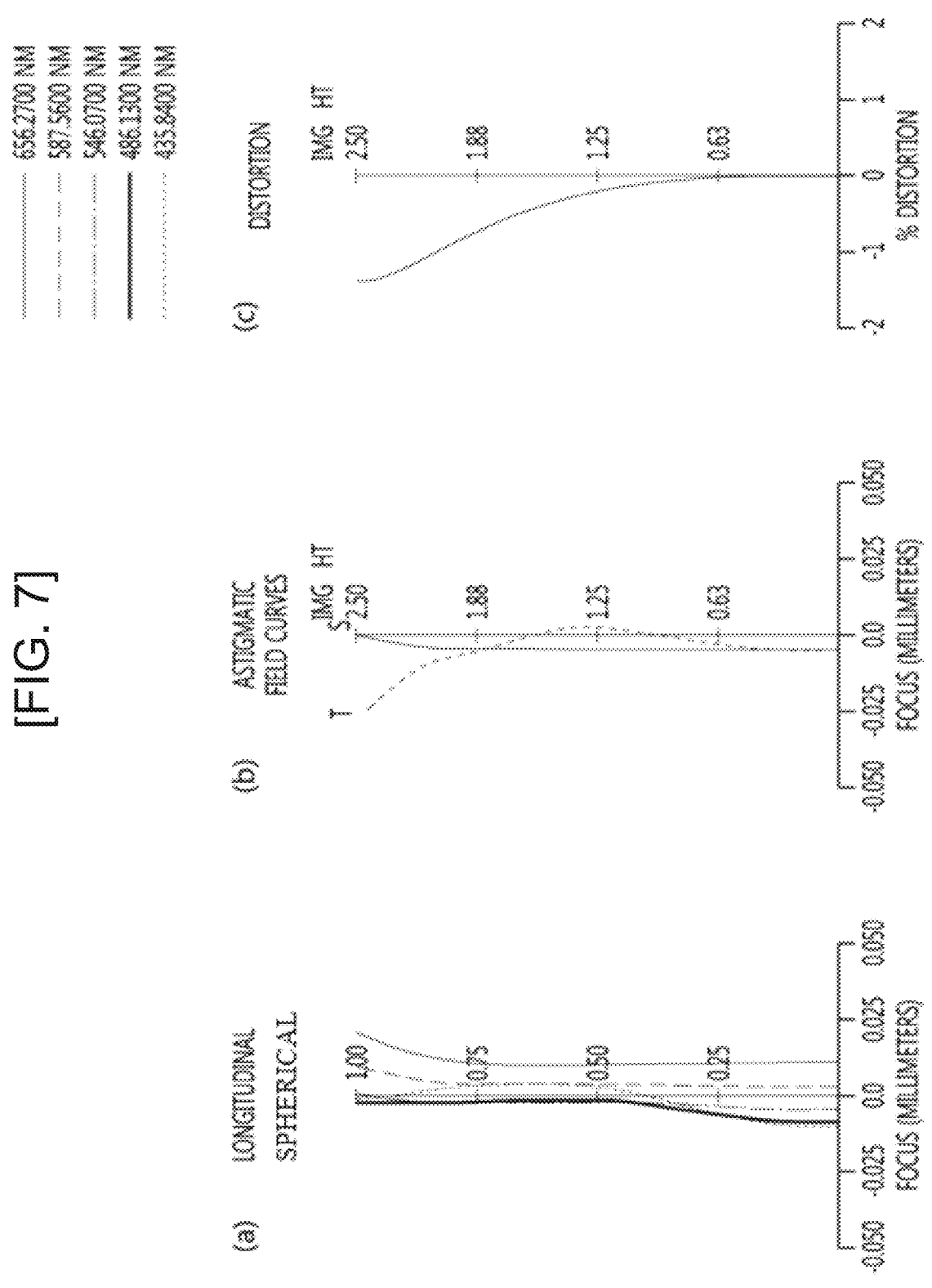

【FIG. 8A】
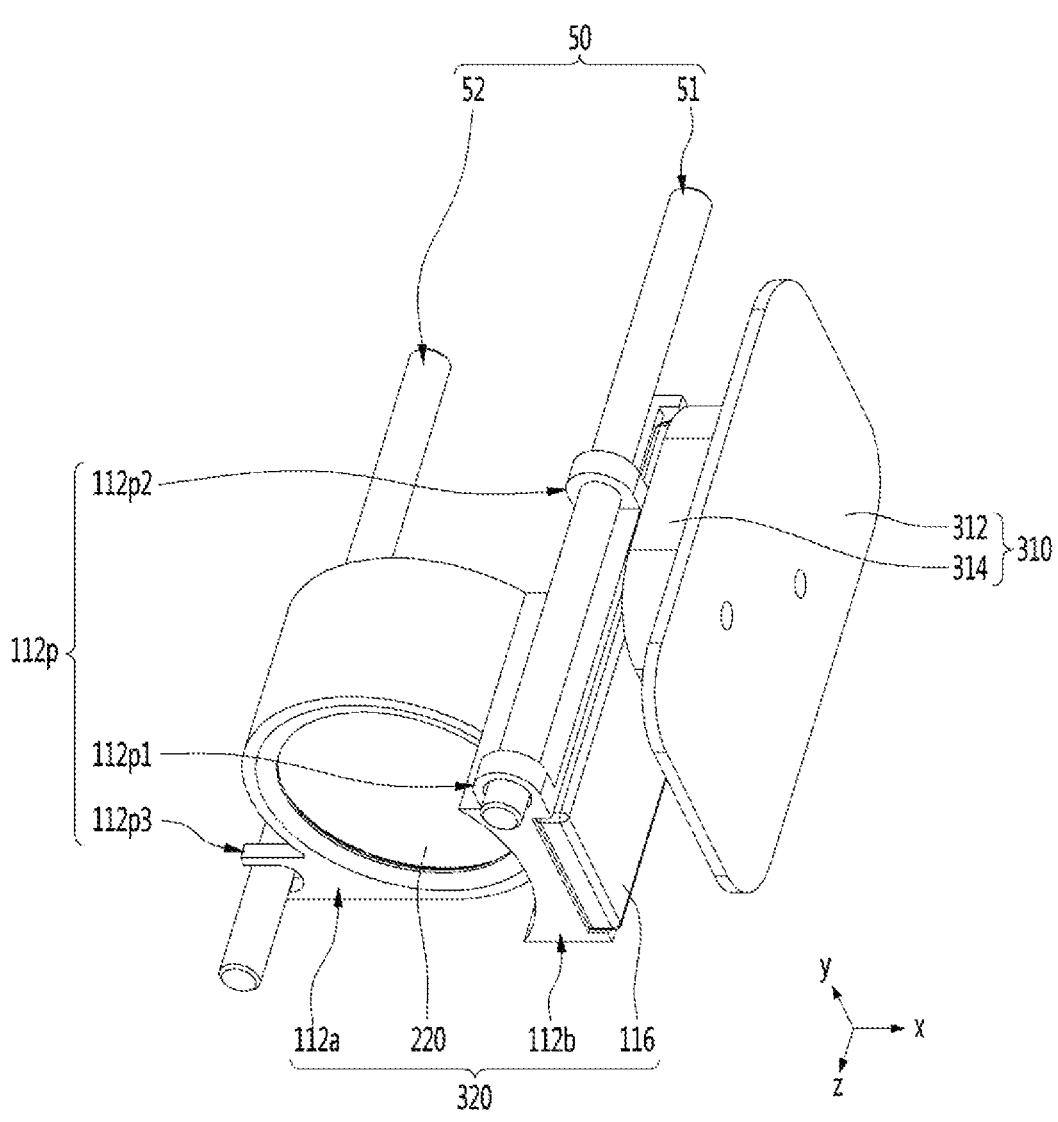

【FIG. 8B】
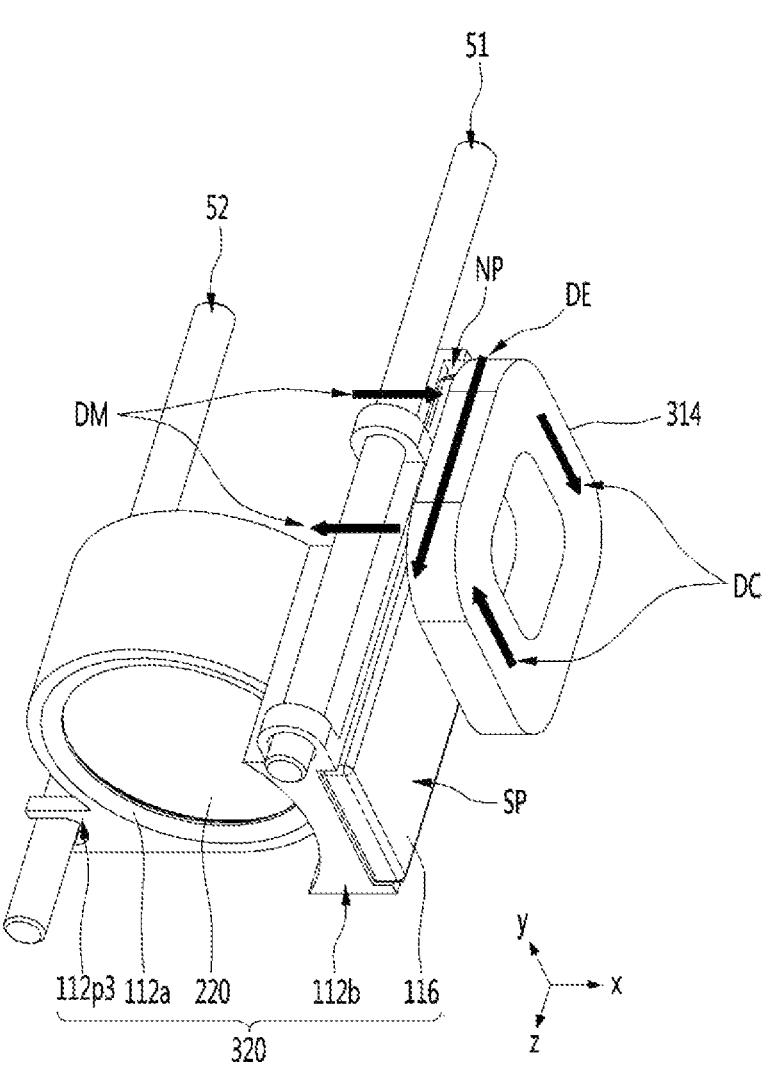

LENS ASSEMBLY AND A CAMERA MODULE INCLUDING THE SAME

CROSS REFERENCE TO RELATED APPLICATIONS

This application is the National Phase of PCT International Application No. PCT/KR2019/017485, filed on Dec. 11, 2019, which claims priority under 35 U.S.C. 119(a) to Patent Application No. 10-2018-0160235, filed in the Republic of Korea on Dec. 12, 2018, all of which are hereby expressly incorporated by reference into the present application.

TECHNICAL FIELD

Embodiments relate to a lens assembly and a camera module including the same.

BACKGROUND ART

The camera module captures a subject and stores it as an image or video, and is installed in mobile terminals such as cell phones, laptops, drones, and vehicles.

On the other hand, portable devices such as smartphones, tablet PCs, and laptops have built-in micro camera modules, and these camera modules can perform Autofocus function (AF) of automatically adjusting the distance between the image sensor and the lens to align the focal length of the lens.

In addition, recent camera modules may perform a zooming function of zooming up or zooming out by increasing or decreasing the magnification of a distant subject through a zoom lens.

In addition, recent camera modules employ image stabilization (IS) technology to correct or prevent image shake due to camera movement caused by unstable fixing devices or user movement.

Such image stabilization (IS) technology includes an optical image stabilizer (OIS) technology and an image shake prevention technology using an image sensor.

The OIS technology is a technology that corrects motion by changing the path of light, and image shake prevention technology using an image sensor is a technology that compensates movement in a mechanical and electronic way, OIS technology is being adopted more.

On the other hand, the resolution of the image sensor increases as the number of pixels becomes higher and the size of the pixel becomes smaller. As the pixel becomes smaller, the amount of light received at the same time decreases. Therefore, the higher the resolution of a camera, the more severe the image shake due to hand shake that occurs when the shutter speed is slowed in a dark environment.

Accordingly, the OIS function has recently been adopted as a necessity in order to take images without distortion by using a high-pixel camera in a dark night or in a moving picture.

On the other hand, OIS technology is a method of correcting image quality by moving the lens or image sensor of the camera to correct the optical path. In particular, OIS technology detects the movement of the camera through a gyro sensor and based on this calculates the distance of the image sensor to move.

For example, the OIS correction method includes a lens movement method and a module tilting method. In the lens movement method, only the lens in the camera module is moved to realign the optical axis to the center of the image sensor. On the other hand, the module tilting method is a method of moving the entire module including the lens and image sensor.

In particular, the module tilting method has a wider compensation range than the lens movement method, and since the focal length between the lens and the image sensor is fixed, image distortion can be minimized.

On the other hand, in the case of the lens movement method, a Hall sensor is used to detect the position and movement of the lens. On the other hand, in the module tilting method, a photo reflector is used to detect the movement of the module. However, both methods use a gyro sensor to detect the movement of the camera user. The OIS controller uses the data recognized by the gyro sensor to predict where the lens or module should move to compensate for the user's movement.

However, in the related art, the camera module requires at least two movable lens groups to perform a zooming function of zooming up or zooming out using a zoom lens. In order to perform image stabilization (IS) technology, a separate actuator is required for lens movement or module tilting.

Accordingly, in the related art, there is a problem in that interference between the driving units of the moving lens group occurs.

For example, in the conventional OIS technology, there is a problem in that the magnet for OIS and the magnet for AF are close to each other and cause magnetic field interference to make driving difficult.

DISCLOSURE

Technical Problem

An embodiment is to provide a lens assembly and a camera module including the same capable of efficiently aligning an optical system by preventing interference between driving units.

Another embodiment is to provide a lens assembly and a camera module including the same capable of implementing zoom in a slim size.

Technical Solution

A lens assembly according to an embodiment may include a first group lens assembly; and a second group lens assembly disposed on one side of the first group lens assembly, wherein the first group lens assembly may include a first lens group and a liquid lens.

The second group lens assembly may include a second lens group, an optical system constituting the first group lens assembly may have a negative (−) refractive power, and an optical system constituting the second group lens assembly may have a positive (+) refractive power.

The second group lens assembly may include a plurality of lenses, and a first group lens assembly-side surface of the lens disposed closest to the first lens group among the plurality of lenses may have a convex surface.

A distance between the first lens group and the second lens group may become closer toward a telephoto angle.

In an embodiment, the value of Fno (TeleFno) at the telephoto position/Fno (WideFno) at the wide-angle position may be greater than 1.

Each of the first lens group and the second lens group may include a plurality of lenses, and the liquid lens may be disposed between the first lens group and the second lens group.

The first lens group may include a first lens and a second lens, and the second lens group may include third to sixth lenses.

A camera module according to an embodiment may include a housing including the lens assembly, in which the first group lens assembly and the second group lens assembly are disposed; and an image sensor disposed on one side of the housing.

In addition, the liquid lens may include a first liquid and a second liquid forming an interface with each other, which adjusts the shape of the interface performing an AF (auto focusing) function.

A physical position of the second lens group may be adjusted to perform zoom.

Also, the first group lens assembly may include a lens barrel in which a plurality of lenses are disposed, a magnet disposed in the lens barrel, and a coil facing the magnet.

In addition, the lens assembly according to the embodiment may include a housing 20, a first group lens assembly 210 disposed in the housing 20, and a second group lens assembly 320 disposed at one side of the first group lens assembly 210.

The first group lens assembly 210 may be a fixed lens assembly, and may include a first lens 211 and a liquid lens 215.

The second group lens assembly 320 may be a movable lens assembly and may include a second lens group 220.

In an embodiment, the first group lens assembly 210 may have a negative (–) refractive power as a whole, and the second group lens assembly 320 may have a positive (+) refractive power as a whole.

One surface of the second group lens assembly 320 may be configured as a convex lens.

The distance between the first group lens assembly 210 and the second group lens assembly 320 may be closer toward a telephoto angle.

In an embodiment, the value of Fno (TeleFno) at the telephoto position/Fno (WideFno) at the wide-angle position may be greater than 1.

The camera module of the embodiment may include the lens assembly.

Advantageous Effects

The embodiment can provide a lens assembly and a camera module including the same capable of efficiently aligning an optical system by preventing interference between driving units.

In addition, the embodiment may include a fixed first group lens assembly 210 including a liquid lens 215 and a driven second group lens assembly 320 such that there is a technical effect of providing a lens assembly and a camera module including the same capable of implementing zoom in a slim size.

DESCRIPTION OF DRAWINGS

FIG. 1 is a perspective view showing a camera module of the embodiment.

FIG. 2 is a first arrangement structure of an optical system in the camera module of the embodiment.

FIG. 3 is a conceptual diagram of a liquid lens in the camera module of the embodiment shown in FIG. 2.

FIG. 4 is aberration characteristic data in a first arrangement structure of an optical system in the camera module of the embodiment shown in FIG. 2.

FIG. 5 is a second arrangement structure of an optical system in the camera module of the embodiment;

FIG. 6 is a conceptual diagram of a liquid lens in the camera module of the embodiment shown in FIG. 5.

FIG. 7 is aberration characteristic data in a second arrangement structure of an optical system in the camera module of the embodiment shown in FIG. 5.

FIG. 8A is an exemplary view of a driving unit of a second group lens assembly in the camera module according to the embodiment.

FIG. 8B is an exemplary view of a driving unit of a second group lens assembly in the camera module according to the embodiment.

MODE FOR INVENTION

Hereinafter, embodiments will be described in detail with reference to the accompanying drawings. Since the embodiments can be modified in various ways and have various forms, specific embodiments will be illustrated in the drawings and described in detail in the text. However, this is not intended to limit the embodiments to a specific form of disclosure, it should be understood to include all changes, equivalents, or substitutes included in the spirit and scope of the embodiments.

Terms such as "first" and "second" may be used to describe various elements, but the elements should not be limited by the terms. These terms are used for the purpose of distinguishing one component from another component. In addition, terms specifically defined in consideration of the configuration and operation of the embodiment are only for describing the embodiment, and do not limit the scope of the embodiment.

In the description of the embodiment, in the case of being described as being formed on the "up (on)" or "down (under)" of each element, the up (on) or down (under) includes both elements in direct contact with each other or in which one or more other elements are indirectly formed between the two elements. In addition, when expressed as "up (on)" or "down(under)", the meaning of not only an upward direction but also a downward direction based on one element may be included.

In addition, relational terms such as "top/upper/above" and "bottom/lower/below" used below do not necessarily require or imply any physical or logical relationship or order between such entities or elements, it may be used to distinguish one entity or element from another entity or element.

EMBODIMENT

FIG. 1 is a perspective view of a camera module 100 according to an embodiment.

In the xyz axis direction shown in FIG. 1, the xz plane may represent a ground, the z axis may mean an optical axis direction or a direction parallel to this, and the x axis may mean a direction perpendicular to the z axis on the ground (xz plane), the y-axis may mean a direction perpendicular to the ground.

Figure 2:
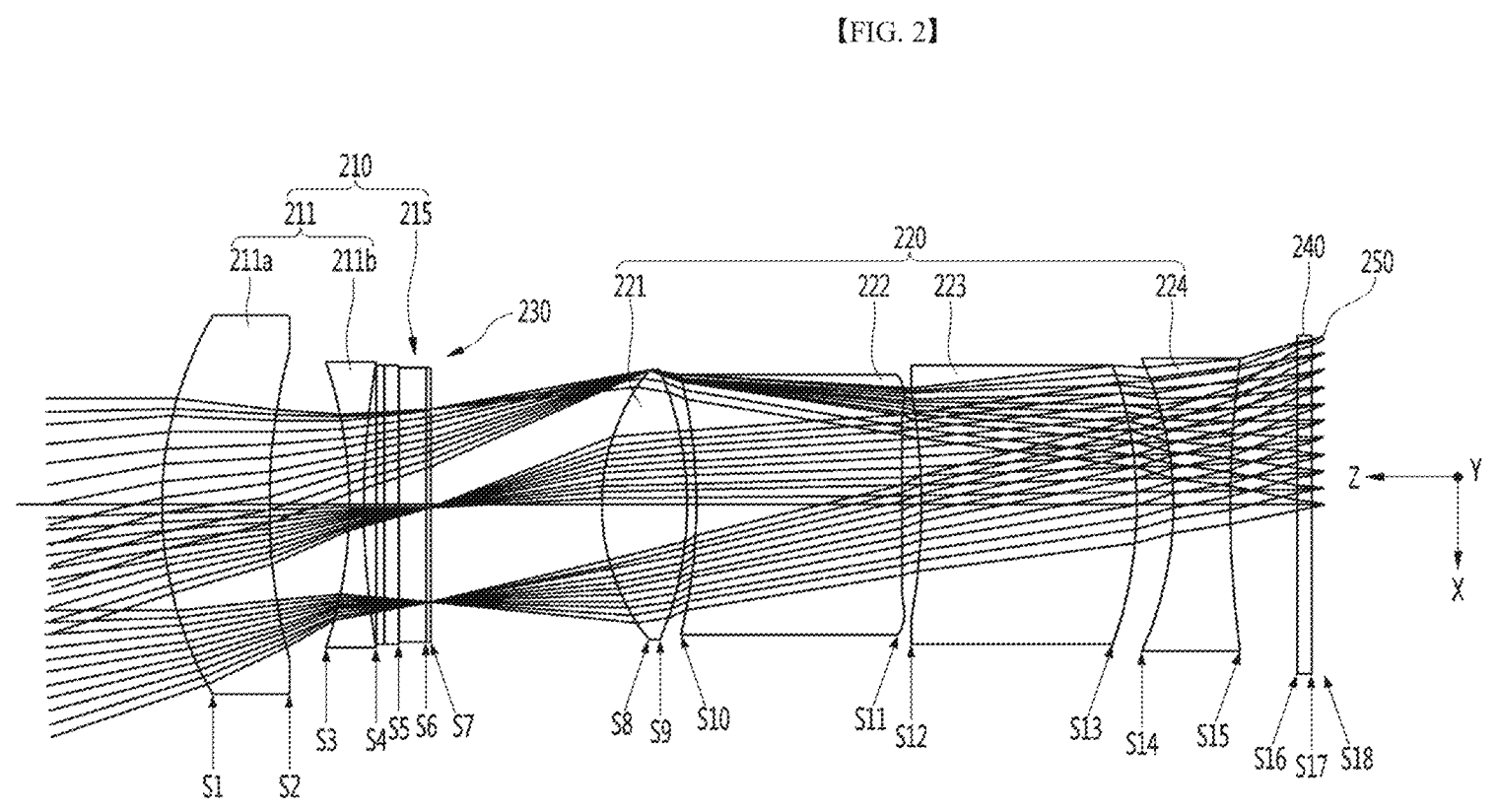

First, referring to FIG. 1, in the camera module 100 according to the embodiment, various optical systems can be disposed in a predetermined housing 20 (see FIG. 2), and one side of the housing 20 can be coupled to the base 30.

The material of the housing 20 may be formed of any one or more of plastic, glass-based epoxy, polycarbonate, metal, or a composite material.

The base 30 may be coupled to the housing 20 by shape fitting or an adhesive. For example, a hook 20H may protrude from a side surface of the housing 20, and a hole is formed in the base 30 at a position corresponding to the hook 20H, and the hook 20H of the housing 20 can be mounted in the hole 20H of the base 30, the base 30 such that the housing 20 can be coupled. In addition, the base 30 may be stably coupled to the housing 20 using an adhesive.

Also, the base 30 and the housing 20 may be coupled to the pin 50. For example, the pin 50 may include a first pin 51 and a second pin 52 spaced apart from each other in parallel to the optical axis. One side of the first pin 51 and the second pin 52 may be fixedly coupled to the base 30 and the other side to the housing 20.

The pin 50 may perform a movement guide function of the moving second group lens assembly 320 as shown in FIGS. 8A and 8B, which will be described later, and may be provided in singular or plural number. The pin 50 may be referred to as a rod or a shaft.

In an embodiment, the driving unit 310 may be disposed on one side of the housing 20 along the x-axis direction perpendicular to the optical axis direction and the ground. The driving unit 310 may include a circuit board 312 and a coil 314, the coil may be disposed to face a magnet disposed in the barrel, and the circuit board may be disposed in the housing. In addition, a first circuit board (not shown) may be disposed under the housing 20 to be electrically connected to the lens drivers inside the housing 20. Technical characteristics of the driving unit 310 and the pin 50 will be described later.

Next, FIG. 2 is a first arrangement structure of the optical system in the camera module of the embodiment, for example, an arrangement structure in a wide position, and FIG. 3 is a conceptual diagram of a liquid lens 215 in the camera module of the embodiment shown in FIG. 2.

In the camera module of the embodiment, in the optical system first arrangement structure, for example, at a wide position, an Equivalent Focal Length (EFL) may be about 7.5, and Fno (F number) may be about 2.1. In the embodiment, Fno is F/D (F: focal length, D: effective aperture), and as the value of Fno increases, the amount of light (light) decreases.

Referring to FIG. 2, the camera module of the embodiment may include a first group lens assembly 210 disposed in the housing 20, and a second group lens assembly 320 including a second lens group 220 disposed at one side of the first group lens assembly 210 (see FIG. 8A).

The first group lens assembly 210 can be a fixed lens assembly in which positions of lenses are fixed to the housing 20, and may include a first lens 211 and a liquid lens 215.

Also, the second group lens assembly 320 can be a moving lens assembly that is physically movable in the housing, and may include a second lens group 220.

Since the embodiment includes the fixed first group lens assembly 210 including the liquid lens 215 and the driven second group lens assembly 320, there is a technical effect in that a lens assembly capable of implementing zoom in a slim size and a camera module including the same can be provided.

According to an embodiment, although not shown, the camera module may include a prism for changing an overall light path, a first lens assembly, a second assembly, and an image sensor. And the optical system may be configured for the first lens assembly and the second lens assembly disposed between a prism and an image sensor.

The prism may have, for example, a triangular prism shape, and in this case, a light path incident on the first surface of the triangular prism may be changed and reflected. The light incident on the first surface of the prism may change a light path toward the first group lens assembly and the second lens assembly.

In addition, the embodiment may further include an aperture 230 between the first group lens assembly 210 and the second group lens assembly 320.

In addition, the embodiment may include an infrared cut-off filter 240 between the second lens group 220 and a predetermined image sensor (not shown), and the infrared cut-off filter 240 may include a single or plural number. Also, in an embodiment, the image surface 250 may be a CCD or CMOS image sensor.

In the first group lens assembly 210 of the embodiment, the first lens 211 may include a single or a plurality of fixed lenses. For example, the first lens 211 may include a first-first lens 211a and a first-second lens 211b, but is not limited thereto. The first-second lens 211b may be disposed adjacent to the liquid lens 215. The first-first lens 211a and the first-second lens 211b may be a plastic lens or a glass lens, but are not limited thereto.

Next, FIG. 3 is a conceptual diagram of the liquid lens 215 in a wide position of the lens module in the camera module of the embodiment shown in FIG. 2.

In the embodiment, the liquid lens 215 of the first group lens assembly 210 may include a first liquid lens LL1 containing a first liquid, and a second liquid lens LL2 containing a second liquid that is not mixed with the first liquid.

In addition, the liquid lens 215 includes a first plate 215a sealing an object side of the first liquid lens LL1 and a second plate 215b sealing an image side of the second liquid lens LL2.

The first liquid or the second liquid can be made of a conductive or polar liquid, and the curvature radius of the liquid interface formed between the first liquid and the second liquid cab be changed according to the applied voltage, and this liquid interface can play a role of refracting surface of the liquid.

Referring back to FIG. 2, in the embodiment, the second group lens assembly 320 can be a moving lens assembly and may include the second lens group 220.

The second lens group 220 may include a single or a plurality of fixed lenses. For example, the second lens group 220 may include a second-first lens 221, a second-second lens 222, a second-third lens 223, and a second-fourth lens 224. The second lens group 220 may include a plastic lens or a glass lens, but is not limited thereto.

Table 1 below shows lens data in the first group lens assembly 210 and the second lens group 220 according to the embodiment. In the embodiment, the material of the first group lens assembly 210 and the second lens group 220 can be plastic. However, the infrared cut filter 240 may include D263T glass material.

TABLE 1

| Surface number | Radius | Thickness | material | Semi aperture | Conic Constant (K) |
|---|---|---|---|---|---|
| 1 | 7.212915437 | 1.608238949 | 661000.204 | 2.81269392 | −3.257662455 |
| 2 | 15.90122705 | 1.20638812 | | 2.3 | 32.04004368 |
| 3 | −5.984785145 | 0.195295217 | 'APL5514' | 2.123772343 | −2.996419149 |
| 4 | 9.62159735 | 0.187525991 | | 2.048422562 | −34.97086272 |
| 5 | Internal R value changed from infinity to 7.96 in Tele | 0.81 | Liquid Lens | 2.04828868 | |
| 6 | 1.00E+18 | 0.2 | | 2.0234874 | |
| 7 | 1.00E+18 | 2.372031364 | | 2.018705672 | |
| 8 | 3.066338049 | 1.279083036 | 'APL5514' | 2 | −0.944488179 |
| 9 | −4.145820689 | 0.126765141 | | 1.993821624 | 0.988960622 |
| 10 | −7.060251308 | 3.073898563 | 661000.204 | 1.923165131 | 9.111102766 |
| 11 | 14324.58099 | 0.297073016 | | 1.747123492 | −7325369294 |
| 12 | −13.69440987 | 3.2 | 661000.204 | 1.723035866 | |
| 13 | −7.822691255 | 0.561481124 | | 2.055886478 | 11.59345796 |
| 14 | −13.70756391 | 0.83551504 | 'APL5514' | 2.035951302 | 0 |
| 15 | 5.296644447 | 0.967425523 | | 2.170568527 | −17.19557459 |
| 16 | 1.00E+18 | 0.027968636 | | 2.394326478 | |
| 17 | 1.00E+18 | 0.21 | 'D263T' | 2.443474224 | |
| 18 | 1.00E+18 | 0.204135251 | | 2.46768308 | |

Meanwhile, in Table 1 above, the thickness value of the seventh surface S7 may have a value of 2.372031364 in tele, and the thickness value of the seventeenth surface S17 may have a value of 0.21 in tele.

Also, in an embodiment, the first group lens assembly 210 may have a negative (−) refractive power as a whole, and the second group lens assembly 320 may have a positive (+) refractive power as a whole.

In the embodiment, if the refractive power is arranged differently from this, it may be difficult to adjust the magnification, and when the first group lens assembly 210 needs to move, the optical path increases and the size of the prism increases.

In the embodiment, the focal length of the first-first lens 211a of the first group lens assembly 210 may be 18.38049 and the refractive power may be 0.054406, the focal length of the first-second lens 211b may be −6.7218 and the refractive power may be −0.14877.

Also, in the embodiment, the focal length of the second-first lens 211 of the second lens group may be 3.440979 and the refractive power thereof may be 0.290615. The focal length of the second-second lens 212 may be 10.5534 and the refractive power thereof may be −0.09476. The focal length of the second-third lens 213 may be 22.39636 and the refractive power thereof may be 0.04465. And the focal length of the second-fourth lens 214 may be −6.88373 and the refractive power thereof may be −0.14527.

The focal length of the liquid lens may be −70.4072 and the refractive power thereof may be −0.0142 when the second group assembly is in the tele position, and the focal length may be infinity and the refractive power may be 0 in the wide position.

The embodiment may implement an optimal optical system by controlling the refractive power of each lens of the first group lens assembly 210 and the second lens group 220 as described above.

In an embodiment, one surface of the second lens group 220 of the second group lens assembly 320 may be configured as a convex lens. If it is configured as a concave lens, an Fno value of 2.4 or more in a wide point section, it may be difficult to construct a bright optical system.

Next, FIG. 4 is aberration characteristic data in the first arrangement structure of the optical system in the camera module of the embodiment shown in FIG. 2. For example, FIG. 4(a) is spherical aberration data, FIG. 4(b) is astigmatism data, and FIG. 4(c) is distortion data. And the lens module of the embodiment can implement a system.

Next, FIG. 5 is a second arrangement structure of the optical system in the camera module of the embodiment, and FIG. 6 is a conceptual diagram of the liquid lens 215 in the camera module of the embodiment shown in FIG. 5.

In the second arrangement structure of the optical system of the camera module of the embodiment shown in FIG. 5, an Equivalent Focal Length (EFL) at a tele position may be about 12.5, and Fno (F number) may be about 3.1.

Referring to FIG. 6, the liquid lens 215 may include a first liquid LL1 and a second liquid LL2 disposed between the first plate 215a and the second plate 215b. A radius of curvature of the liquid interface formed between the first liquid and the second liquid can be changed according to the applied voltage, so that one liquid interface serves as a refracting surface.

Through this, according to the embodiment, auto-focusing (AF) can be performed by controlling the interface between the first liquid and the second liquid of the liquid lens.

In addition, according to the embodiment, the OIS function can be implemented by controlling the interface between the first liquid and the second liquid of the liquid lens 215, and there is a technical effect that does not need to insert a separate OIS structure.

The embodiment can include a fixed first group lens assembly 210 including a liquid lens 215 that functions as a refractive surface by changing one liquid interface and a driven second group lens assembly 320 driven. Accordingly, there is a technical effect of providing a lens assembly capable of implementing zoom in a slim size and a camera module including the same.

Next, FIG. 7 is aberration characteristic data in the second arrangement structure of the optical system in the camera module of the embodiment shown in FIG. 5. For example, FIG. 7(a) is spherical aberration data, FIG. 7(b) is astigmatism data, and FIG. 7(c) is distortion data. And the lens module of the embodiment can implement a system.

According to an embodiment, the distance between the first group lens assembly 210 and the second lens group 220 provided in the second group lens assembly 320 may become closer toward a telephoto angle.

On the other hand, when the lens becomes wide as it gets closer, a lens fixing group is additionally required, so there is a problem in that the optical system assembly and cost increase.

Also, in an embodiment, a value of Fno (TeleFno) at the telephoto position/Fno (WideFno) at the wide-angle position may be greater than 1. On the other hand, when this value is less than or equal to 1, the size of the first group lens assembly is increased. Since the size of the optical system is increased, a small optical system cannot be formed.

According to the embodiment, one movement group may be configured, and accordingly, there is a technical effect of providing a lens assembly capable of implementing zoom in a slim size and a camera module including the same.

Next, FIG. 8A is an exemplary view of the driving unit of the second group lens assembly 320 in the camera module according to the embodiment, and FIG. 8B is an example of the driving unit of the second group lens assembly 320 in the camera module according to the embodiment.

Referring to FIG. 8A, the lens barrel 112 of the second group lens assembly 320 includes a first area 112a where lenses are disposed and a second area 112b that extends from the first area and where magnets are disposed. The first region 112a functions as a barrel, and the above-described second lens group 220 may be mounted thereon (refer to FIG. 2 or FIG. 5).

Next, a magnet 116 may be disposed in the second region 112b of the lens barrel. In the second region, a receiving groove in which a magnet is disposed may be formed. The magnet 116 of the second group lens assembly 320 may be a magnet driving unit, but is not limited thereto. For example, the magnet 116 may include a magnet that is a permanent magnet.

An interaction in which electromagnetic force is generated between the magnet 116 and the coil 314 in the camera module according to the embodiment will be described with reference to FIG. 8B.

As shown in FIG. 8B, the magnetization method of the magnet 116 in the camera module according to the embodiment may be a vertical magnetization method. For example, in the embodiment, both the N pole NP and the S pole SP of the magnet 116 may be magnetized to face the coil 314. Accordingly, the N pole and the S pole of the magnet 116 may be disposed to correspond to a region in which current flow in the y-axis direction perpendicular to the ground in the coil 314.

Referring to FIG. 8B, in the embodiment, when a magnetic force is applied in the x-axis direction at the N pole of the magnet 116 (direction of magnetic force: DM), and a current flow in the opposite direction to the y-axis in the coil 314 (direction of current, DC). According to Fleming's left-hand rule, electromagnetic force acts in a direction parallel to the z-axis direction (direction of electromagnetic force: DE).

In addition, in the embodiment, when a magnetic force is applied in the opposite direction to the x-axis at the S pole of the magnet 126 and a current flow in the y-axis direction perpendicular to the ground in the coil 314, the electromagnetic force is generated in the z-axis direction according to Fleming's left-hand rule.

At this time, since the driving unit 310 including the coil 314 is in a fixed state, the second group lens assembly 320 which is a mover on which the magnet 116 is disposed, may move in a direction parallel to the direction opposite to the z-axis. The electromagnetic force may be controlled in proportion to the current applied to the coil 314.

Referring back to FIG. 8A, in the embodiment, the second region 112b includes one or more protrusions 112p to guide the movement of the second group lens assembly 320 in the optical axis direction.

For example, the second region 112b may include a first protrusion 112p1 protruding upward, and a first guide hole may be disposed in the first protrusion 112p1.

In addition, the second region 112b may further include a second protrusion 112p2 that protrudes upward and is spaced apart from the first protrusion 112p1. A first guide hole may be disposed in the second protrusion 112p2.

Accordingly, in the embodiment, the protrusion 112p may include the first protrusion 112p1 and the second protrusion 112p2.

According to an embodiment, the first pin 51 may be fitted to the first protrusion 112p1 and the second protrusion 112p2 to precisely guide the second group lens assembly 320 parallel to the optical axis direction.

Through this, according to the embodiment, by contacting the first pin 51 at the first protrusion 112p1 and the second protrusion 112p2 of the lens barrel 112, it is possible to minimize the mutual contact area to prevent frictional resistance. Accordingly, according to the embodiment, there are technical effects such as improvement of driving force and reduction of power consumption by preventing friction torque generation during zooming.

Also, referring to FIG. 8A, the first region 112a includes one or more protrusions 112p protruding laterally to guide the movement of the second group lens assembly 320 in the optical axis direction and to move up and down at the same time. It is possible to prevent the center axis from being tilted by preventing the lens unit from being tilted.

For example, the first region 112a may include a third protrusion 112p3 protruding laterally, and a first guide groove may be disposed in the third protrusion 112p3.

According to the embodiment, the second pin 52 is fitted into the first guide groove of the third protrusion 112p3 to precisely guide the second group lens assembly 320 parallel to the optical axis direction.

Accordingly, according to the embodiment, by supporting the second pin 52 in the third protrusion 112p3 of the first region 112a, it is possible to prevent inclination of the lens unit up and down to prevent the central axis from being misaligned.

Also, in the embodiment, the second pin 52 may be in contact with the third protrusion 112p3 of the first region 112a. Accordingly, there are technical effects such as improvement of driving force during zooming, reduction of power consumption and improvement of control characteristics by minimizing frictional area to prevent frictional resistance.

INDUSTRIAL APPLICABILITY

The camera module according to the embodiment may be mounted on a mobile terminal, a laptop computer, a drone, a vehicle, or the like.

The embodiment can provide a lens assembly capable of efficiently aligning an optical system by preventing interference between driving units and a camera module including the same.

In addition, according to an embodiment, there are technical effects in that a lens assembly capable of implementing zoom in a slim size and a camera module including the same are provided by including a fixed first group lens assembly including a liquid lens and a driving second lens assembly.

Features, structures, effects, etc. described in the above embodiments are included in at least one embodiment, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the embodiments.

In the above, the embodiment has been mainly described, but this is only an example and does not limit the embodiment, and those of ordinary skill in the art to which the embodiment pertains are provided with several examples not illustrated above within a range that does not depart from the essential characteristics of the embodiment. It can be seen that variations and applications of branches are possible. For example, each component specifically shown in the embodiment can be implemented by modification. And differences related to such modifications and applications should be interpreted as being included in the scope of the embodiments set forth in the appended claims.

The invention claimed is:

1. A camera module comprising:
a lens assembly comprising:
    a first group lens assembly; and
    a second group lens assembly disposed on one side of the first group lens assembly;
a housing where the first group lens assembly and the second group lens assembly are disposed; and
an image sensor disposed on one side of the housing,
wherein the first group lens assembly comprises a first lens group and a liquid lens,
wherein the second group lens assembly comprises a second lens group,
wherein an optical system constituting the first group lens assembly has a negative refractive power,
wherein an optical system constituting the second group lens assembly has a positive refractive power,
wherein the liquid lens is disposed between the first lens group and the second lens group,
wherein each of the first lens group and the second lens group comprises a plurality of lenses,
wherein the first lens group comprises a first lens and a second lens, each of the first lens and the second lens comprising a plastic lens or a glass lens,
wherein the second lens group is a moving lens group and comprises a third lens, a fourth lens, a fifth lens, and a sixth lens, each of the third lens, the fourth lens, the fifth lens, and the sixth lens comprising a plastic lens or a glass lens,
wherein each lens in the first group lens assembly has a fixed position with respect to an optical axis direction,
wherein the moving lens group of the second lens group is disposed between the first group lens assembly having the fixed position and the image sensor without another interposed fixed lens group being located between the moving lens group and the image sensor,
wherein a first surface of the second lens of the first lens group contacts the liquid lens and a second surface of the second lens opposite the first surface of the second lens does not contact the first lens of the first lens group,
wherein the first surface of the second lens of the first lens group that contacts the liquid lens includes a concave surface such that edge portions of the first surface the second lens contact the liquid lens but a central portion of the first surface the second lens does not contact the liquid lens, and
wherein the second surface of the second lens opposite the first surface of the second lens includes a concave surface.

2. The camera module according to claim 1, wherein the liquid lens comprises a first liquid and a second liquid that form an interface with each other.

3. The camera module according to claim 2, wherein the liquid lens performs an auto focusing (AF) function by adjusting a shape of the interface, and performs zoom by adjusting a physical position of the second lens group.

4. The camera module according to claim 1, further comprising a coil,
wherein the second group lens assembly comprises a lens barrel in which the plurality of lenses are disposed and a magnet disposed in the lens barrel, and
wherein the coil faces the magnet.

5. The camera module according to claim 1, wherein an aperture size of the liquid lens is less than that of the first lens group.

6. The camera module according to claim 5, wherein the liquid lens comprises a first liquid lens containing a first liquid, and a second liquid lens containing a second liquid that is not mixed with the first liquid, a first plate sealing an object side of the first liquid lens and a second plate sealing an image side of the second liquid lens.

7. The camera module according to claim 6, wherein the first liquid or the second liquid comprises a conductive or polar liquid, and a curvature radius of a liquid interface formed between the first liquid and the second liquid is changed according to an applied voltage.

8. The camera module according to claim 6, wherein the first liquid lens and the second liquid lens comprise a flat lens surface at a wide position.

9. The camera module according to claim 1, wherein the first lens of the first group lens assembly comprises a positive refractive power, and
wherein the second lens of the first group lens assembly comprises a negative refractive power.

10. The camera module according to claim 1, wherein the third lens of the second lens group comprises a positive refractive power,
wherein the fourth lens of the second lens group comprises a positive refractive power,
wherein the fifth lens of the second lens group comprises a positive refractive power, and
wherein the sixth lens of the second lens group comprises a negative refractive power.

11. The camera module according to claim 1, wherein a first group lens assembly-side surface of a lens disposed closest to the first group lens assembly among the plurality of lenses of the second lens group is a convex surface.

12. The camera module according to claim 1, wherein a distance between the first group lens assembly and the second group lens assembly is narrower toward a telephoto angle.

13. The camera module according to claim 1, wherein a value of Fno (TeleFno) at a telephoto position/Fno (WideFno) at a wide-angle position is greater than 1.

14. The camera module according to claim 1, wherein the first lens of the first lens group includes a concave surface and a convex surface.

15. The camera module according to claim 1, wherein a focal length of the first lens of the first lens group is greater than a focal length of the second lens of the first lens group.

16. The camera module according to claim 1, wherein a refractive power of the first lens of the first lens group is greater than a refractive power of the second lens of the first lens group.

* * * * *